US008577315B2

(12) United States Patent
Anzures et al.

(10) Patent No.: US 8,577,315 B2
(45) Date of Patent: Nov. 5, 2013

(54) RADIO RECEIVER

(75) Inventors: Freddy A. Anzures, San Francisco, CA (US); Henry Mason, Santa Clara, CA (US); Lucas Newman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 900 days.

(21) Appl. No.: 12/475,860

(22) Filed: Jun. 1, 2009

(65) Prior Publication Data

US 2010/0304702 A1 Dec. 2, 2010

(51) Int. Cl.
*H04B 1/18* (2006.01)

(52) U.S. Cl.
USPC .................................... 455/154.2; 455/186.1

(58) Field of Classification Search
USPC .......... 455/550.1, 575.1, 179.1, 180.1, 185.1, 455/186.1, 186.2
See application file for complete search history.

(56) References Cited

U.S. PATENT DOCUMENTS 4,969,209 A 11/1990 Schwob
5,428,825 A * 6/1995 Tomohiro et al. .......... 455/186.1
5,864,753 A 1/1999 Morita et al.
6,289,207 B1 9/2001 Hudecek et al.
6,505,088 B1 1/2003 Simkin et al.
6,611,678 B1 8/2003 Zweig et al.
6,697,631 B1 2/2004 Okamoto
6,711,390 B1 * 3/2004 Moers ........................ 455/186.1
6,748,237 B1 6/2004 Bates et al.
7,313,359 B2 12/2007 Steelberg et al.
7,346,320 B2 3/2008 Chumbley et al.
7,369,825 B2 5/2008 Slupe
7,499,683 B2 3/2009 Ogasawara
7,551,889 B2 6/2009 Quelle
7,587,185 B2 9/2009 Nee
7,643,807 B2 1/2010 Gupta et al.
7,787,407 B2 8/2010 Kostic et al.
7,844,301 B2 11/2010 Lee et al.
7,929,931 B2 4/2011 Nakamura et al.
7,962,162 B2 6/2011 McNair
2001/0035087 A1 11/2001 Subotnick
2003/0040272 A1 2/2003 Lelievre et al.
2004/0198279 A1 * 10/2004 Anttila et al. .............. 455/179.1
2007/0142055 A1 6/2007 Toivanen et al.
2007/0259685 A1 11/2007 Engblom
2008/0057891 A1 * 3/2008 Klunk ........................ 455/186.1

(Continued)

FOREIGN PATENT DOCUMENTS

EP 0 964 514 12/1999
JP 02-153415 6/1990
WO 2008-027836 3/2008

OTHER PUBLICATIONS

Anzures et al., "Content Selection Based on Simulcast Data", U.S. Appl. No. 12/467,206, filed May 15, 2009.

(Continued)

*Primary Examiner* — Thanh Le
(74) *Attorney, Agent, or Firm* — Jennifer Luh

(57) ABSTRACT

Operating a radio receiver can include identifying a set of stations that broadcast a radio program using different frequencies or different transmission protocols at substantially the same time. Broadcast signal strength, or some other signal quality metric, of broadcast signals from the stations can be evaluated, and the radio receiver can be tuned to one of the stations in the set of stations based on the evaluation.

20 Claims, 14 Drawing Sheets

(56) References Cited

U.S. PATENT DOCUMENTS

| | | | |
|---|---|---|---|
| 2008/0065722 A1 | 3/2008 | Brodersen et al. | |
| 2008/0119148 A1 | 5/2008 | Ray | |
| 2008/0198141 A1 | 8/2008 | Lee et al. | |
| 2009/0093300 A1 | 4/2009 | Lutnick et al. | |
| 2009/0239573 A1 | 9/2009 | Kretz | |
| 2010/0004031 A1 | 1/2010 | Kim | |
| 2010/0033422 A1 | 2/2010 | Mucignat | |
| 2010/0233980 A1* | 9/2010 | Uppala | 455/185.1 |

OTHER PUBLICATIONS

Anzures et al., "Processing Simulcast Data", U.S. Appl. No. 12/467,223, filed May 15, 2009.

Anzures et al., "Accelerometer-Based Control for Radio Broadcast Receivers", U.S. Appl. No. 12/467,179, filed May 15, 2009.

* cited by examiner

RADIO RECEIVER

TECHNICAL FIELD

This subject matter is generally related to radio receivers.

BACKGROUND

FM (frequency modulation) broadcast radio stations transmit FM radio signals over assigned frequencies. In some examples, the FM radio frequency band extends from about 87 to 104 MHz. An FM radio receiver includes a tuner that can tune to a particular frequency broadcast by a particular radio station. Each FM broadcast radio station broadcasts signals at not more than a specified power level, so the FM radio signals have limited geographical reach. When a user moves from one location to another location, the user may experience fading of signals as the user moves out of the broadcast range of the FM broadcast station. The user can adjust the tuner to tune to another FM radio station that has a stronger signal and listen to a different program.

SUMMARY

Operating a radio receiver can include identifying a set of stations that broadcast a radio program using different frequencies or different transmission protocols at substantially the same time. Broadcast signal strength, or some other signal quality metric, of broadcast signals from the stations can be evaluated, and the radio receiver can be tuned to one of the stations in the set of stations based on the evaluation. The radio receiver can be, e.g., an FM radio receiver, and the stations can include, e.g., primary FM and FM translator stations.

Operating a radio receiver can include retrieving information about pre-selected radio stations, and for each of the pre-selected stations, identifying one or more stations that are associated with the pre-selected radio station, the one or more stations broadcasting the same program on different frequencies. The radio receiver can be tuned to one of the one or more stations associated with one of the pre-selected radio stations based on an evaluation of signals from the one or more stations associated with the one of the pre-selected radio stations.

A radio receiver can include a first tuner, a second tuner, a signal evaluator to evaluate signals from the first and second tuners based on at least one metric, and a data processor. The data processor can control the first and second tuners to tune to two stations that broadcast a program on different frequencies at substantially the same time, and select one of the first and second tuners based on evaluation data provided by the signal evaluator.

A radio receiver can include a tuner, and a data processor that identifies a set of stations that broadcast a radio program on different frequencies at substantially the same time. The data processor can control the tuner to tune to one of the stations based on an evaluation of signals from a plurality of the stations in the set of stations.

These features allow a user to listen to radio programs with no (or almost no) interruption as the user travels across broadcast ranges of radio stations that broadcast the same radio programs at substantially the same time.

DETAILED DESCRIPTION

A radio receiver that can automatically switch among a set of stations (e.g., primary and translator stations) is disclosed. Switching can occur when the radio receiver moves from one location to another location so that a user does not lose reception of a radio signal as he travels outside the broadcast range of one of the stations. In one example, the radio receiver can switch among stations that broadcast signals using the same transmission protocol but different frequencies. In another example, the radio receiver can switch among stations that broadcast signals using different transmission protocols.

For example, a user can listen to a radio program broadcast from a primary FM station, turn off the FM radio receiver, turn on the FM radio receiver after traveling to a different location, and the FM radio receiver automatically tunes to an FM translator station if the signal from the primary FM station is too weak. The user may also start at a location within the broadcast range of a translator station, then later the FM radio receiver automatically tunes to a primary FM station or another FM translator station. If the FM radio receiver cannot find an FM translator station having a sufficiently strong signal, the FM radio receiver may also switch to another radio station that broadcasts a radio program of the same genre as the program that was previously played. The FM radio receiver can show FM radio stations on a map and allow a user to easily choose a station. The map can be updated automatically to show FM radio stations within reception range as the map is reconfigured, such as zoomed in, zoomed out, or re-centered.

The radio programs can include, e.g., music programs, radio talk shows, news programs, lectures, audio blogs, podcasts, or recordings from audio books. The broadcasts can be in analog or digital format.

For example, the radio receiver can have multiple tuners and demodulators, and can receive signals modulated using various transmission protocols, such as FM radio signals, amplitude modulation (AM) radio signals, and satellite radio signals. The radio receiver can automatically switch from one station to another based on a number of criteria, such as broadcast signal strength, signal quality, or user defined preferences.

Instead of automatically switching between stations, the radio receiver can be configured to notify the user that other stations are broadcasting the same program (or programs of the same genre), provide information about the other stations (e.g., the transmission protocol, station name, broadcast signal strength, and whether the audio is mono or stereo), and let the user decide whether to switch to a different station.

Figure 1:
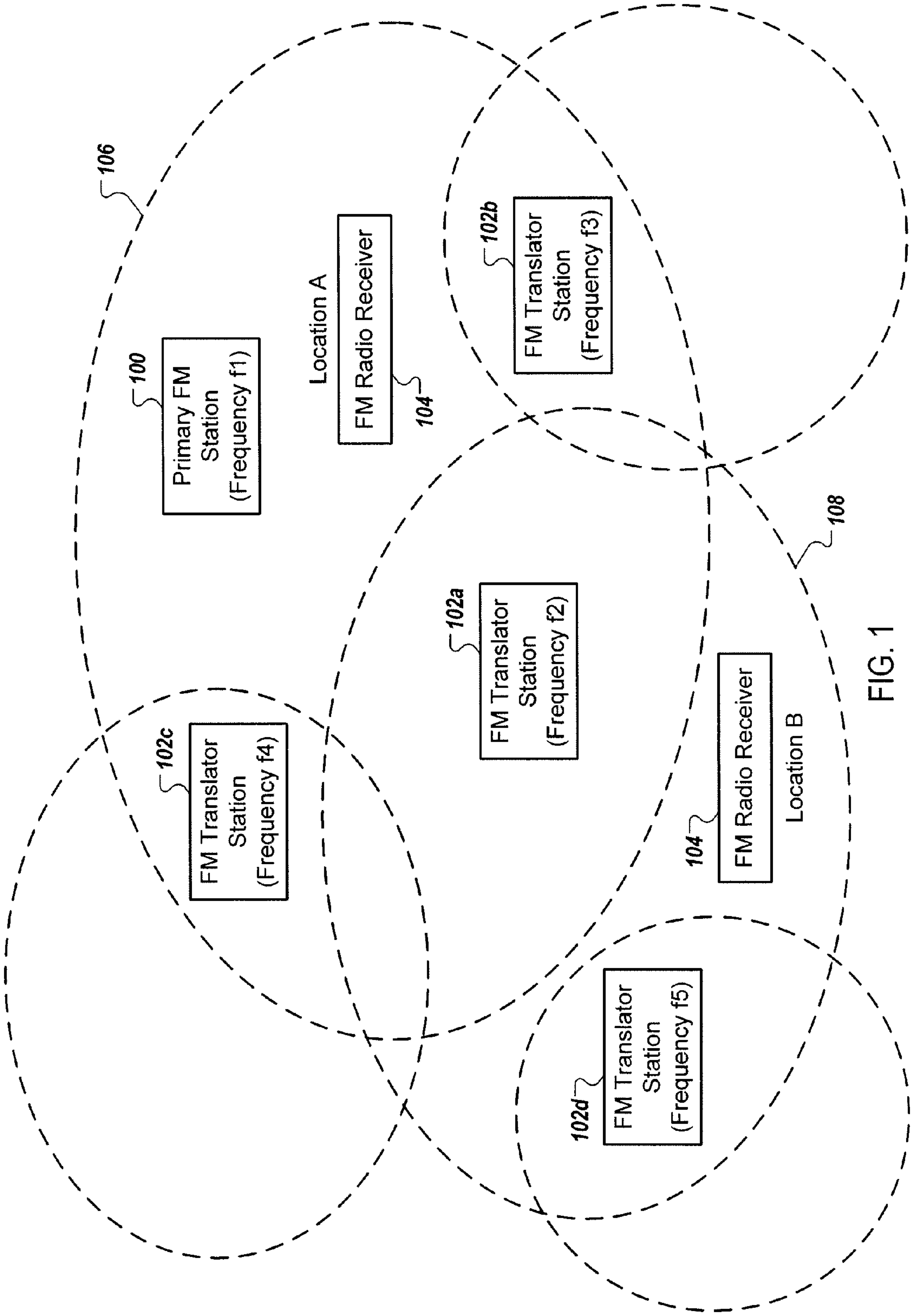
FIG. 1 is a diagram of a primary FM station and FM translator stations.

Referring to FIG. 1, primary FM station 100 can broadcast radio signals that are retransmitted by FM translator stations (e.g., 102*a*, 102*b*, 102*c*, 102*d*, collectively 102). Each FM translator station 102 retransmits the signals of primary FM station 100 or another FM translator station 102 without significantly altering characteristics of the incoming signal other than its frequency and amplitude in order to provide FM broadcast service to a broader audience. For example, primary FM station 100 may broadcast signals at a frequency f1, and FM translator stations 102*a*, 102*b*, 102*c*, and 102*d* may broadcast signals at frequencies f2, f3, f4, and f5, respectively.

When FM radio receiver 104 is at location A within broadcast range 106 (enclosed in a dashed line) of primary FM station 100, receiver 104 can tune to frequency f1 to receive signals broadcast from primary FM station 100 directly. When FM radio receiver 104 moves to location B, which is outside broadcast range 106 of primary FM station 100, the broadcast signals from station 100 may be too weak for receiver 104 to receive a useful signal. Because location B is within broadcast range 108 (enclosed in a dashed line) of FM translator station 102*a*, FM radio receiver 104 can tune to frequency f2 to receive signals retransmitted by FM translator station 102*a*.

In some implementations, FM radio receiver 104 can be configured to monitor a broadcast signal strength of the FM radio signal, and when the broadcast signal strength drops below a threshold, such as when a user of receiver 104 travels outside broadcast range 106 of primary FM station 100, receiver 104 can search for possible FM translator stations 102 having stronger signals. If FM radio receiver 104 finds a number of FM translator stations having stronger signals, receiver 104 can either automatically (i.e., without manual operation from the user) switch to tuning to the FM translator station (e.g., 102*a*) having the strongest signal, or prompt the user before switching.

For example, if the user travels outside of broadcast range 108 of FM translator station 102*a* and returns to broadcast range 106 of primary FM station 100, FM radio receiver 104 may automatically switch back to tuning to primary FM station 100. If the user travels outside of broadcast range 108 of FM translator station 102*a* and enters the broadcast range of another FM translator station, e.g., 102*d*, FM radio receiver 104 may automatically switch to tuning to FM translator station 102*d*.

FM radio receiver 104 may include a location sensor that determines a location of receiver 104. The location sensor can be, e.g., a global positioning system (GPS) sensor that determines location based on GPS signals broadcast from satellites. The location sensor can also determine location by triangulating the location using Wi-Fi and cellular towers.

FM radio receiver 104 may include a database having information about the locations of primary FM stations 100 and FM translation stations 102 at various geographical regions. The information can include, e.g., the broadcast frequencies of the stations. Using the database, FM radio receiver 104 can identify primary FM stations 100 and FM translation stations 102 in a vicinity (e.g., within a predetermined distance) of FM radio receiver 104. FM radio receiver 104 may also connect to a network (e.g., the Internet) to access a proprietary or public database having information on the locations of various primary FM stations 100 and FM translation stations 102 in order to determine which radio stations are in the vicinity of FM radio receiver 104.

FM radio receiver 104 may include a database having information about broadcast signal strength contours of various primary FM stations 100 and FM translator stations 102. FM radio receiver 104 may also connect to the network to access a proprietary or public database having information on the broadcast signal strength contours. For example, broadcast signal strength contour information may be obtained from the Federal Communications Commission (FCC). FM radio receiver 104 may download and cache information about the broadcast signal strength contours of the primary FM stations and FM translator stations in the vicinity of FM radio receiver 104. The cached information can be updated when FM radio receiver 104 moves to a new location.

FM radio receiver 104 can estimate a broadcast signal strength of FM translator station 102 based on the location of FM radio receiver 104 and the information about broadcast signal strength contours of FM translator station 102. The broadcast signal strength of FM translator station 102 at the location of FM radio receiver 104 can be estimated by looking up or interpolating broadcast signal strength contour values, or by applying an algorithm to the broadcast signal strength contour values. Other methods for estimating the broadcast signal strength can also be used.

For example, FM radio receiver 104 may communicate with server computer 220 (see FIG. 8), in which FM radio receiver 104 provides location information (e.g., longitude and latitude coordinates of FM radio receiver 104) to server computer 220, and server computer 220 returns a list of primary FM stations 100 and associated FM translator stations 102 in the vicinity of FM radio receiver 104.

Server computer 220 may estimate the broadcast signal strength of various primary FM stations 100 and FM translator stations 102 in the vicinity of FM radio receiver 104, and send the signal strength information to FM radio receiver 104. This way, FM radio receiver 104 does not need to store a large amount of information about the radio stations and broadcast signal strength contours, and does not need to have the processing power to execute algorithms to compute the broadcast signal strength. When FM radio receiver 104 moves to a new location, FM radio receiver 104 sends the new coordinates to server computer 220, and server computer 220 returns information about radio stations in the vicinity of FM radio receiver 104 and their estimated broadcast signal strength.

The estimated broadcast signal strength may be different from the actual broadcast signal strength. For example, FM radio receiver 104 may move to a location beside a building that partially blocks radio signals, and the estimated broadcast signal strength may not reflect the actual broadcast signal strength at the particular location. In some implementations, FM radio receiver 104 upon detecting signal fading at a first radio station, estimates the broadcast signal strength of the signals from other radio stations, and switches to a second radio station having the strongest estimated broadcast signal strength. After switching to the other radio station, FM radio receiver 104 measures the actual broadcast signal strength of the second radio station. If the measured broadcast signal strength of the second radio station is greater than the broadcast signal strength of the first radio station, FM radio receiver 104 continues to tune to the second radio station. If the measured broadcast signal strength of the second radio station is weaker than the broadcast signal strength of the first radio station, FM radio receiver 104 may switch back to the first radio station, or switch to a third radio station that has the second highest estimated broadcast signal strength, and so forth.

Figure 2:
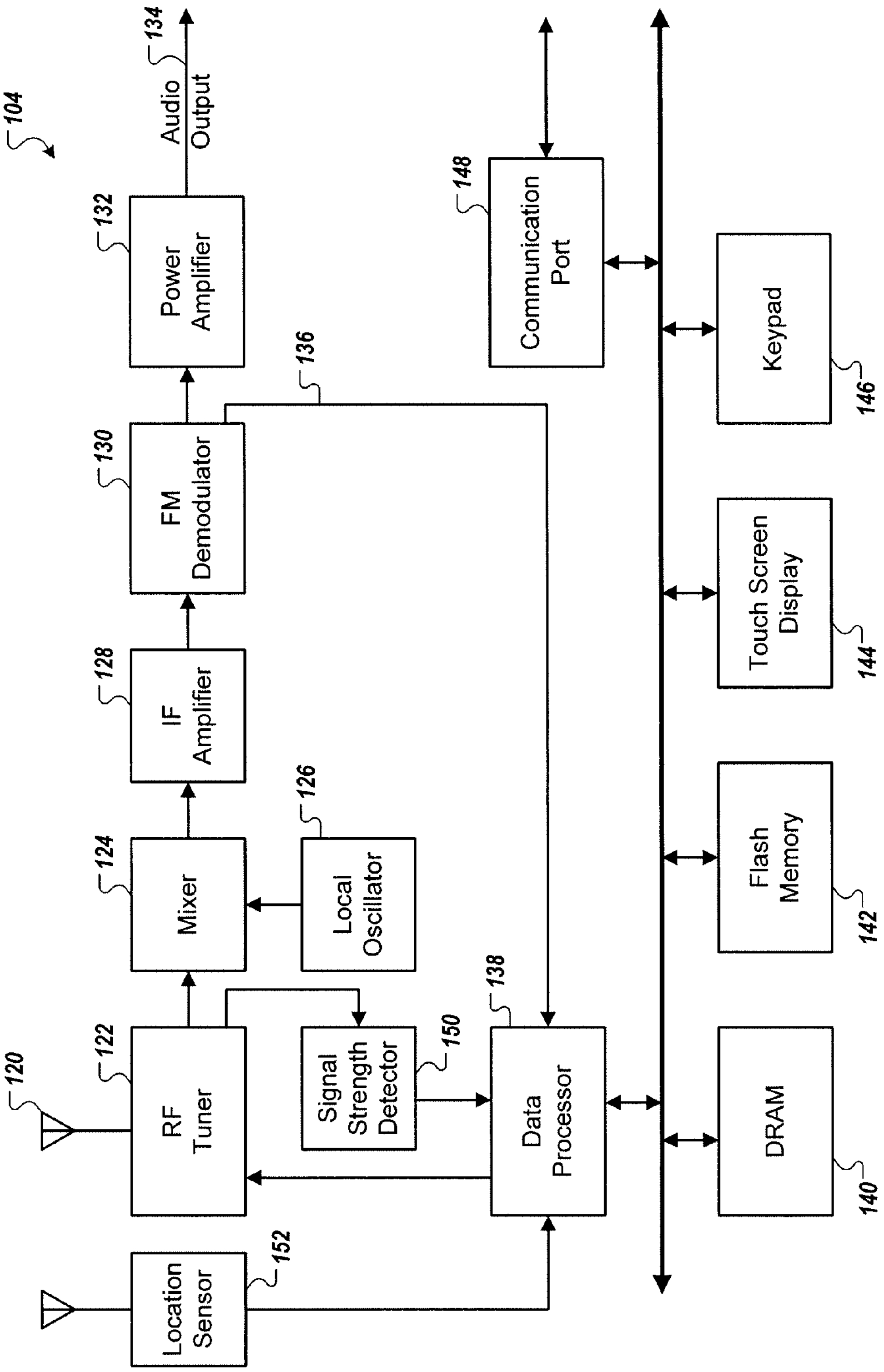
FIGS. 2 to 5 are block diagrams of example radio receivers according to various embodiments of the invention.

Referring to FIG. 2, in some implementations, FM radio receiver 104 may include antenna 120 connected to RF tuner 122, which selects and amplifies a narrow band signal from the signal received at antenna 120 and sends the narrow band signal to mixer 124. Mixer 124 mixes the narrow band RF signal with an oscillation signal from local oscillator 126 to generate an IF signal that is amplified by IF amplifier 128. The amplified IF signal is demodulated by FM demodulator 130 and further amplified by power amplifier 132 to generate audio output signal 134, which can include, e.g., mono, stereo, or surround audio. In some examples, FM demodulator 130 may generate auxiliary information 136 contained in a sideband signal, such as station call letters. Auxiliary information 136 is sent to data processor 138. RF tuner 122 can be adjusted to tune to various frequencies to selectively receive signals from various radio stations. The center frequency of RF tuner 122 (i.e., the frequency that RF tuner 122 is tuned to) can be controlled by data processor 138. Signal strength detector 150 measures the strength of the received radio signal and forwards the signal strength information to data processor 138.

In some implementations, data processor 138 executes software instructions or code to control various components of FM radio receiver 104, enabling receiver 104 to perform various functions, such as determining a current position, retrieving information on user preferences, identifying primary FM stations 100 and FM translator stations 102 in the vicinity of receiver 104, estimating broadcast signal strength of the radio stations, and switching among the radio stations based on the broadcast signal strength or other signal quality metrics. It may take a short period of time (e.g., a fraction of a second) to switch from one station to another, so the user may experience a slight discontinuity in the broadcast program when radio receiver 104 is switching stations.

FM radio receiver 104 can include a volatile memory device, such as dynamic random access memory (DRAM) device 140, and a non-volatile memory device, such as flash memory device 142 or a hard disk drive, for storing data and program instructions or code. Location sensor 152 detects a position of FM radio receiver 104. FM radio receiver 104 includes input/output devices, such as keypad 146 and a display (e.g., touch screen display 144). Communication port 148 enables FM radio receiver 104 to connect to a network (e.g., the Internet).

Flash memory device 142 may store a database having information about the locations of primary FM stations 100 and FM translation stations 102 at various geographical regions. FM radio station 104 may also connect to a network through communication port 148 to access a proprietary or public database having information on the locations of various primary FM stations 100 and FM translation stations 102. Flash memory device 142 may store a database having information about broadcast signal strength contours of various primary FM stations 100 and FM translator stations 102. FM radio receiver 104 may also connect to the network through communication port 148 to access a proprietary or public database having information on the broadcast signal strength contours.

Data processor 138 can estimate the broadcast signal strength of FM translator station 102 based on the location of FM radio receiver 104 and the information about broadcast signal strength contours of FM translator station 102. The broadcast signal strength of FM translator station 102 at the location of FM radio receiver 104 can be estimated by looking up or interpolating broadcast signal strength contour values, or by applying an algorithm to the broadcast signal strength contour values.

If data processor 138 determines, based on estimated broadcast signal strength of stations, that another station different from the station whose program is currently being played has a greater broadcast signal strength, data processor 138 may control RF tuner 122 to tune to the other station. The FM radio receiver 104 is said to be tuned to a station when the broadcast signal from the station is selected by the tuner of radio receiver 104, demodulated, and output to the user.

FM radio receiver 104 can be a stand alone product or be part of a larger system. For example, FM radio receiver 104 may be part of a mobile phone and shares the data processor and memory with other mobile phone components. FM radio receiver 104 can be a device that is attached to a notebook computer through a wired or wireless interface, e.g., a universal serial bus (USB) connection, and shares the data processor and memory of the notebook computer. FM radio receiver 104 can be a peripheral card that is configured to be inserted into a peripheral card slot of a notebook computer.

Figure 3:
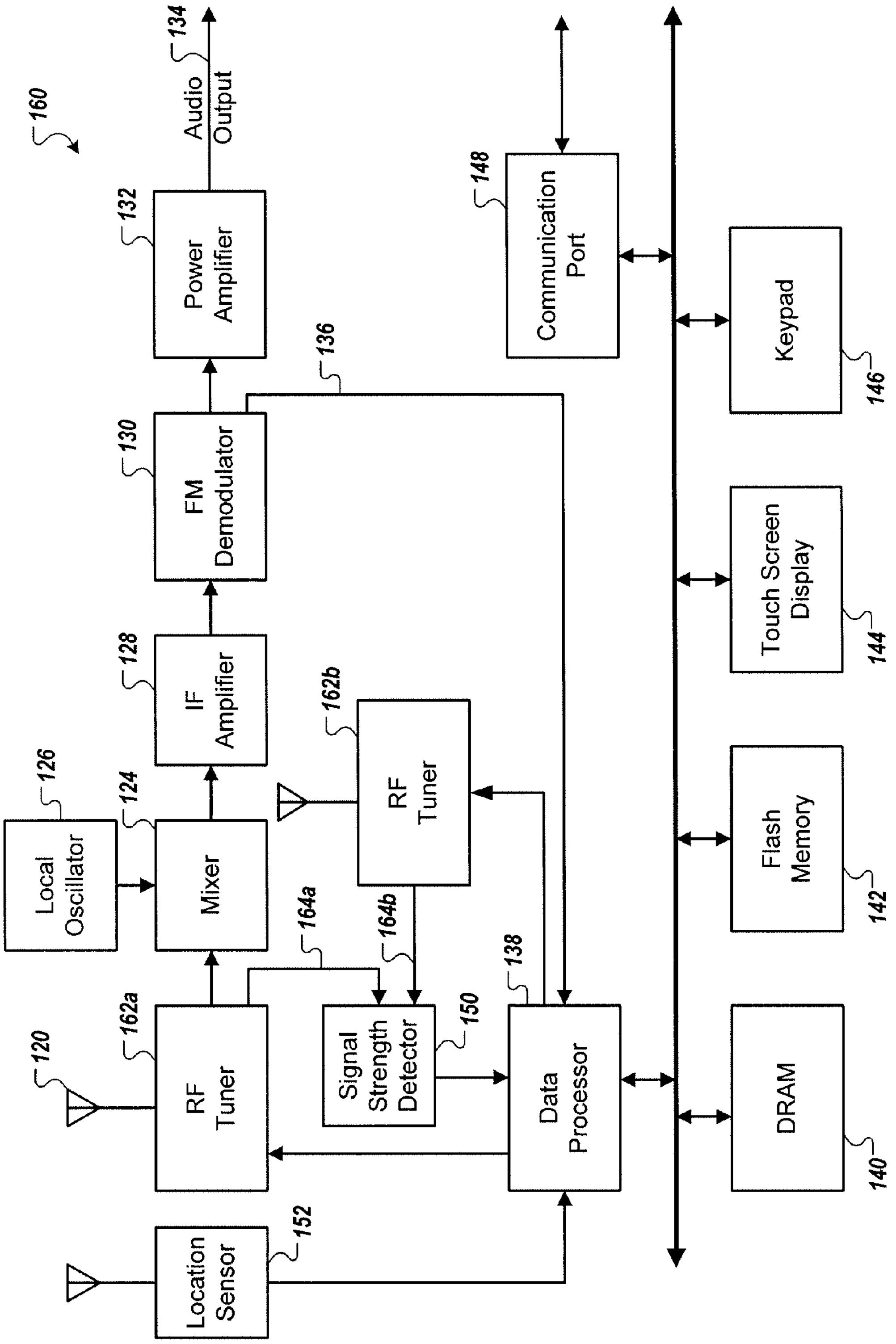

Referring to FIG. 3, in some implementations, radio receiver 160 may include two RF tuners 162*a* and 162*b* that are controlled by data processor 138. Data processor 138 tunes RF tuner 162*a* to the station whose program is played to the user, and uses RF tuner 162*b* to find another station that broadcasts the same program and has a greater broadcast signal strength.

For example, radio receiver 160 may include a database (e.g., stored in flash memory 142) having information about the locations of stations at various geographical regions, and information about which stations broadcast the same programs at substantially the same time. Using the database, radio receiver 160 can identify stations in a vicinity of receiver 160 that are broadcasting the same program that is being played to the user. Radio receiver 160 may also connect to a network (e.g., the Internet) through communication port 148 to access a proprietary or public database having information on the locations of various stations in order to identify the radio stations.

Based on the station information about the stations, data processor 138 controls tuner 162*b* to tune of one of the identified stations. Output signals 164*a* and 164*b* from tuners 162*a* and 162*b*, respectively, are sent to signal strength detector 150, which detects the strength of output signals 164*a* and 164*b* and provides the detection data to data processor 138.

For example, suppose first tuner 162*a* is tuned to a first station, e.g., station A, and second tuner 162*b* is tuned to a second station, e.g., station B, and stations A and B are broadcasting the same program. If data processor 138 determines, based on the data provided by signal strength detector 150, that the broadcast signal from station B has a greater broadcast signal strength than the signal from station A, data processor 138 may control tuner 162*a* to tune to station B. Data processor 138 may either automatically control RF tuner 162*a* to switch to station B, or prompt the user for confirmation before switching. Radio receiver 160 is said to be tuned to a station when the broadcast signal from the station is selected by a tuner of radio receiver 160, demodulated, and output to the user.

If data processor 138 determines that the signal from station B does not have a greater broadcast signal strength than the signal from station A, data processor 138 may control tuner 162*b* to tune to a third station, e.g., station C, and compare the broadcast signal strength of the signals of stations A and C, and determine whether to switch to station C, and so forth. The criteria for choosing stations is not limited to the broadcast signal strength. Other signal quality metrics can also be used.

If radio receiver 160 does not have information about signal strength contours, data processor 138 may control RF tuner 162*b* to tune to each of the stations in the vicinity of radio receiver 160 that are broadcasting the same program as the station that RF tuner 162*a* is tuned to. Data processor 138 logs the broadcast signal strength of the signal from each of the stations, identifies the station that has the strongest broadcast signal strength, and controls RF tuner 162*a* to tune to the station that has the strongest broadcast signal strength.

For example, radio receiver 160 may periodically initiate finding of a more suitable station that has a stronger broadcast signal strength. For example, radio receiver 160 may initiate finding of a more suitable station when the strength of the output signal from RF tuner 162 drops below a threshold value. For example, radio receiver 160 may initiate finding of a more suitable station upon receiving a user input.

If radio receiver 160 has access to a database having information about broadcast signal strength contours of various stations, radio receiver 160 can estimate a broadcast signal strength of a station based on the location of radio receiver 160 and the information about broadcast signal strength contours of the stations. Radio receiver 160 may also communicate with a server computer 220 (FIG. 8) to obtain estimated broadcast signal strength of various stations in the vicinity of radio receiver 160.

Suppose RF tuner 162 is tuned to station A, and data processor 138 determines that two stations, e.g., stations D and E, in the vicinity of radio receiver 160 have estimated broadcast signal strength greater than the measured broadcast signal strength (as measured by signal strength detector 150) of station A, and the estimated broadcast signal strength of station D is greater than that of station E. Data processor 138 controls RF tuner **162*b* to tune to station D and checks whether the measured broadcast signal strength of station D (as measured by signal strength detector 150) is greater than that of station A. If station D has a measured broadcast signal strength that is greater than that of station A, data processor 138 controls RF tuner 162*a*** to tune to station D.

If station D has a measured broadcast signal strength that is weaker than that of station A, data processor 138 controls RF tuner **162*a* to tune to station E, and checks whether the measured broadcast signal strength of station E (as measured by signal strength detector 150) is greater than that of station A. If station E has a measured broadcast signal strength that is greater than that of station A, data processor 138 controls RF tuner 162*a* to tune to station E. If station E has a measured broadcast signal strength that is weaker than that of station A, data processor 138** waits for a period of time (or waits for the user to move a certain distance, or waits for user input) before attempting to find another station having a broadcast signal strength greater than that of station A.

Figure 4:
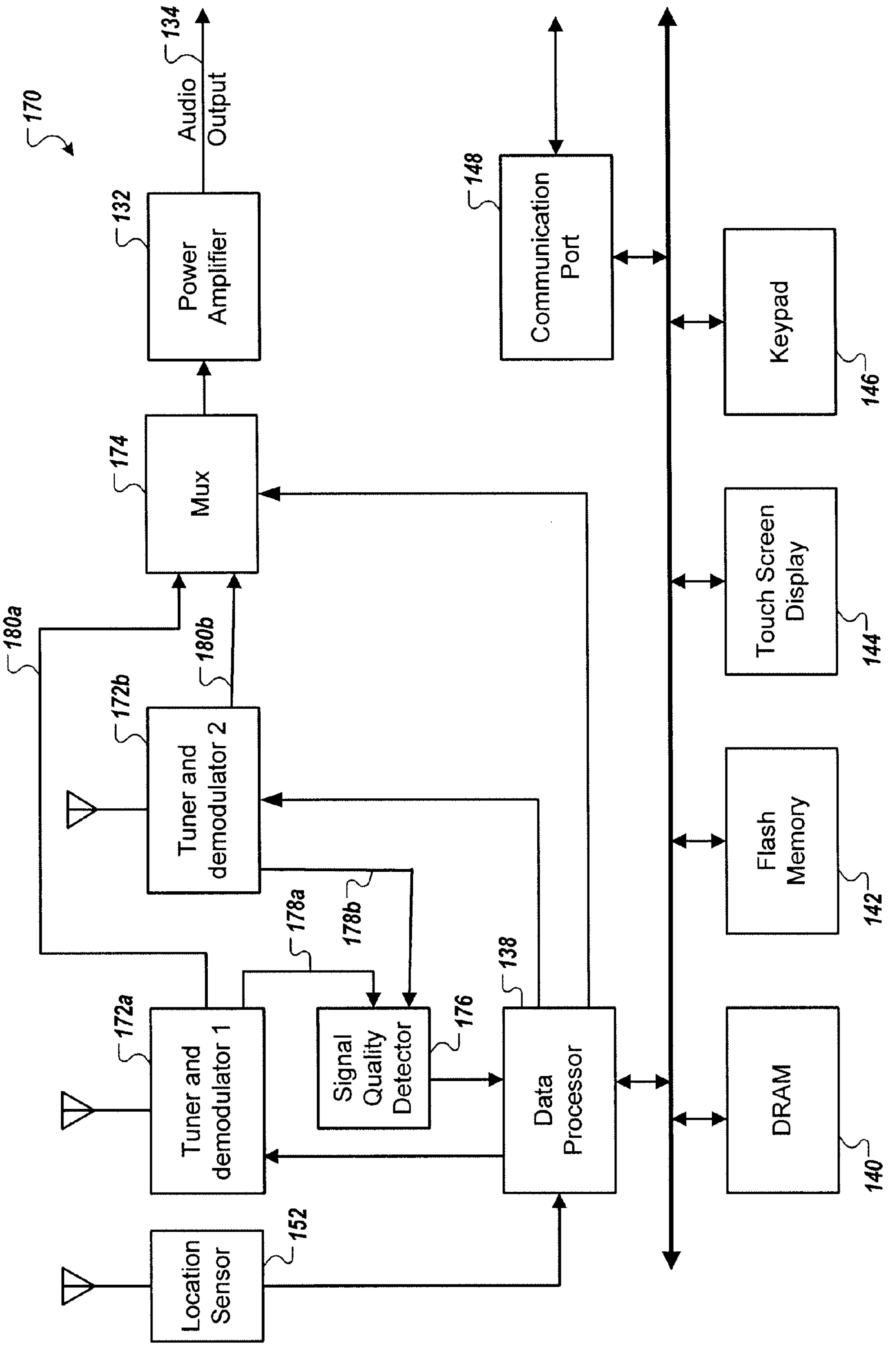

Referring to FIG. 4, in some implementations, radio receiver 170 includes first tuner and demodulator **172*a* that tunes to a first broadcast station and demodulates the signal from the first station. Second tuner and demodulator 172*b* tunes to a second broadcast station and demodulates the signal from the second station. First tuner and demodulator 172*a* will simply be referred to as tuner 172*a*, and second tuner and demodulator 172*b* will be referred to as tuner 172*b*. Tuners 172*a* and 172*b* output signals 180*a* and 180*b*, respectively, to multiplexer 174, which selects one of signals 180*a* and 180*b*, and sends the selected signal to power amplifier 132. The selection of signals by multiplexer 174 is controlled by data processor 138. Tuners 172*a* and 172*b* output signals 178*a* and 178*b*, respectively, to signal quality detector 174, which detects quality of signals 178*a* and 178*b*. For example, signal quality detector 174 may evaluate one or more parameters of signals 178*a* and 178*b***, such as broadcast signal strength, signal to noise ratios, and whether the signals support mono, stereo, or surround audio.

One of the tuners **172*a* and 172*b* provides a signal that is processed and output to the user. The other of the tuners 172*a* and 172*b* is used to find another station that is more suitable (e.g., provides a signal with a better quality). For example, signals 178*a* and 178*b* can be outputs from RF tuners (e.g., similar to outputs from tuners 162*a* and 162*b* of FIG. 3) or outputs from demodulators (e.g., similar to the output from demodulator 130). Signal quality detector 174 provides detection data to data processor 138. Based on the detection data from signal quality detector 176, data processor controls multiplexer 174 to select the signal with a higher quality. The selected signal is amplified and output to the user. The radio receiver 170 is said to be tuned to a station when the broadcast signal from the station is selected by a tuner of radio receiver 170** and processed and output to the user.

For example, when radio receiver 170 is powered up and the user selects a station, data processor 138 may initially control tuner **172*a* to tune to the station selected by the user, and control multiplexer 174 to select signal 180*a* from tuner 172*a*. Data processor 138 uses tuner 172*b* to search for another station with a higher quality, and controls multiplexer 174 to switch to tuner 172*b* when such a station is found. When signals from tuner 172*b* are processed and output to the user, data processor 138 uses tuner 172*a* to search for another station with a better quality, and controls multiplexer 174 to switch to tuner 172*a*** when such a station is found, and so forth.

Figure 5:
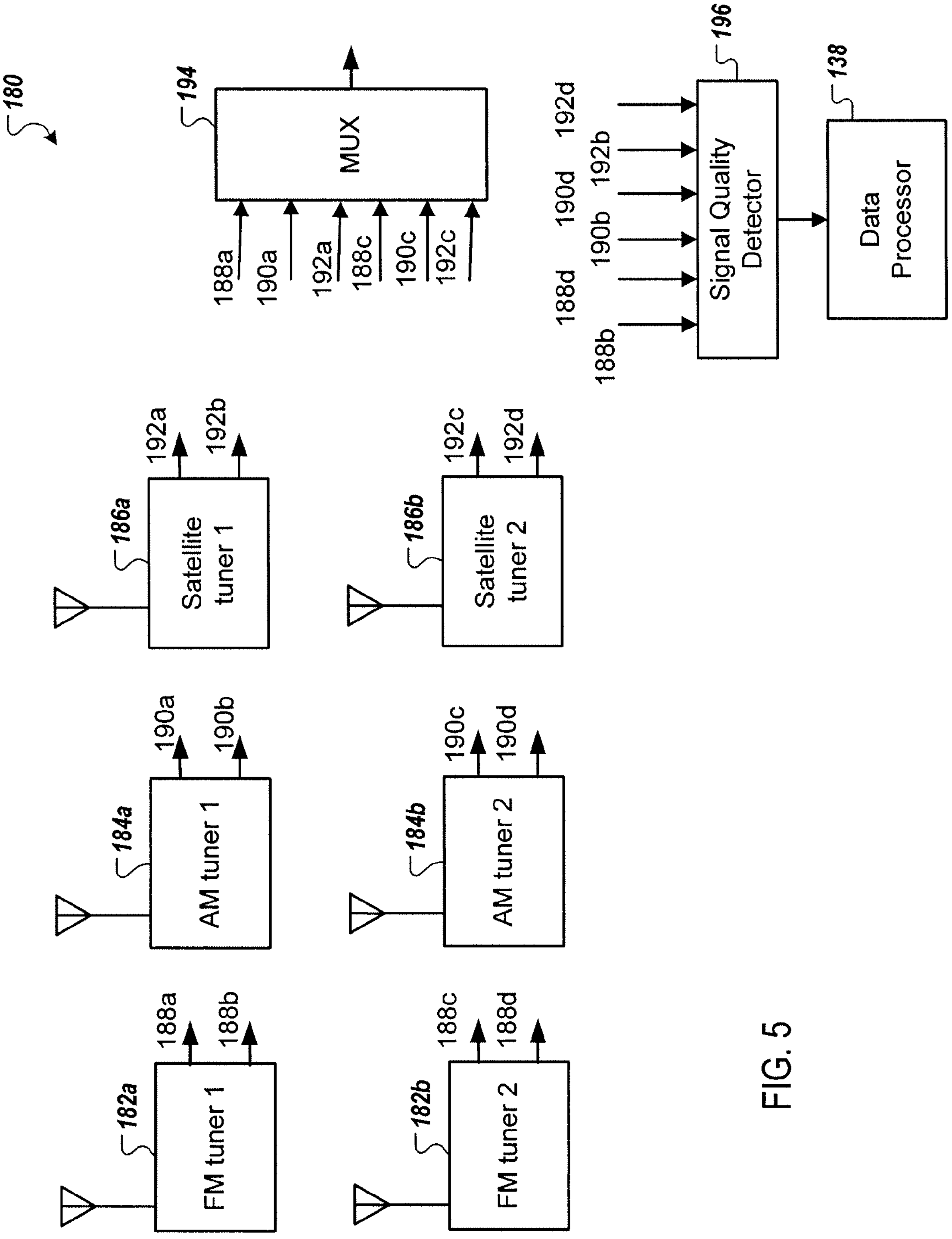

Referring to FIG. 5, in some implementations, radio receiver 180 may switch among stations associated with different transmission protocols or frequency bands, such as AM radio stations, FM radio stations, and satellite radio stations. For example, radio receiver 180 may include two FM tuners **182*a* and 182*b* that tune to FM radio stations and demodulate the signals from the FM radio stations. Two AM tuners 184*a* and 184*b* are provided to tune to AM radio stations and demodulate the signals from the AM radio stations. Two satellite tuners 186*a* and 186*b* are provided to tune to satellite radio stations and demodulate the signals from the satellite radio stations. For example, the satellite stations can be XM or Sirius satellite radio stations. Radio receiver 180** can be useful for listening to programs that are broadcast using multiple transmission protocols.

Demodulated signals **188*a*, 188*c*, 190*a*, 190*c*, 192*a*, and 192*c* from FM tuner 182*a*, FM tuner 182*b*, AM tuner 184*a*, AM tuner 184*b*, satellite tuner 186*a*, and satellite tuner 186*b*, respectively, are sent to multiplexer 194, which selects one of the signals for further processing and output to the user. Signals 188*b*, 188*d*, 190*b*, 190*d*, 192*b*, and 192*d* from FM tuner 182*a*, FM tuner 182*b*, AM tuner 184*a*, AM tuner 184*b*, satellite tuner 186*a*, and satellite tuner 186*b*, respectively, are sent to signal quality detector 196, which detects the quality of the signals and provides detection information to data processor 138**.

When the signal from one of the tuners is selected by multiplexer 194, the other tuners can be used to find another station that provides a signal with a better quality. For example, initially the user may be within the broadcast range of an AM radio station, then travels to a location within the broadcast range of a first FM radio station, in which the AM radio station and the first FM radio station are both broadcasting the same program, and the signal from the first FM radio station has a higher quality than the signal from the AM radio station. Radio receiver 180 may switch from the AM radio station to the first radio FM station. The user may travel to a location where a second FM radio station that is broadcasting the same program as the first FM radio station has a better signal quality than the first FM radio station, and radio receiver 180 may switch from the first FM radio station to the second FM radio station. The user may travel to a location within the broadcast range of a satellite radio station that broadcasts the same program as the second FM radio station, and the signal from the satellite radio station may have a higher quality than the signal from the second FM radio station. Radio receiver 180 may switch from the FM radio station to the satellite radio station. Radio receiver 180 may also switch from, e.g., a satellite radio station to an AM or FM radio station if the AM or FM radio station provides signals with a higher quality.

The following describes an example technique for synchronizing signals when switching radio stations. In some implementations, a radio receiver (such as radio receiver 170 or 180) can include memory buffers or utilize memory buffers of a larger system to synchronize audio when the radio receiver switches from one radio station to another. For example, the radio receiver can be implemented as part of a larger system, such as a mobile phone or a multimedia player, and the memory buffers can be part of the system memory that the radio receiver shares with other applications.

For example, a first station may be broadcasting the same program as a second station, but delayed for a short period of time. By using a buffer to delay the signal from the second station, the radio receiver can switch smoothly from the first station to the second station to allow a user to listen to a program without skipping a portion of the program. For example, a first station may be broadcasting the same program as a second station, but the first station may be ahead of the second station by a short period of time. By using a buffer to delay the signal from the first station, the radio receiver can switch smoothly from the first station to the second station to allow a user to listen to a program without repeating a portion of the program.

The radio receiver can include a first tuner and a second tuner. Analog to digital converters (ADC) are provided to convert demodulated analog signals to digital signals (digitally sampled data). If the demodulated signal is in digital format (e.g., as in digital FM radio or digital satellite radio), the analog to digital conversion step can be omitted. The digital signal from the first tuner can be stored in a first memory buffer, and the digital signal from the second tuner can be stored in a second memory buffer. The output data from the first and second memory buffers are sent to a multiplexer, which selects the data from one of the memory buffers and sends the selected data to a digital to analog converter (DAC). The DAC converts the digital signal to an analog signal that is amplified and output to the user.

The first and second memory buffers can store data that correspond to, e.g., several seconds of audio. The relative delay between the signals from the first and second tuners can be adjusted by, for example, adjusting the amount of data stored in the first and second memory buffers. Suppose initially each of the first and second memory buffers stores data representing p seconds of audio from the first and second tuners, respectively. Data processor 138 can analyze the data stored in the first and second memory buffers and determine whether there is a time lag between the signals from the first and second tuners. The data can be analyzed by using, e.g., pattern matching.

Suppose the signal from the first tuner is currently output to the user, and the signal from the second tuner has a better quality. If the signal from the first tuner lags q seconds behind the signal from the second tuner, data processor 138 can increase the amount of data stored in the second memory buffer, such that audio samples from the second tuner are stored in the second memory buffer for p+q seconds before being output. The second memory buffer introduces a q-second delay in the signal from the second tuner relative to the signal from the first tuner, thereby synchronizing the signals from the first and second tuners. Alternatively, data processor 138 can decrease the amount of data stored in the first memory buffer, such that audio samples from the first tuner are stored in the first memory buffer for p−q seconds before being output. The first memory buffer introduces a q-second lead in the signal from the first tuner relative to the signal from the second tuner, thereby synchronizing the signals from the first and second tuners.

Similarly, if the signal from the second tuner lags q seconds behind the signal from the first tuner, data processor 138 can either increase the amount of data stored in the first memory buffer to introduce a q-second delay in the signal from the first tuner relative to the signal from the second tuner, or decrease the amount of data stored in the second memory buffer to introduce a q-second lead in the signal from the second tuner relative to the signal from the first tuner.

Data processor 138 can analyze the data stored in the first and second memory buffers, confirm that the output data from the first and second memory buffers are synchronized, and control the multiplexer to select data from the second memory buffer, thereby switching from the first tuner to the second tuner. Switching from the second tuner to the first tuner can be performed in a similar manner.

Figure 6:
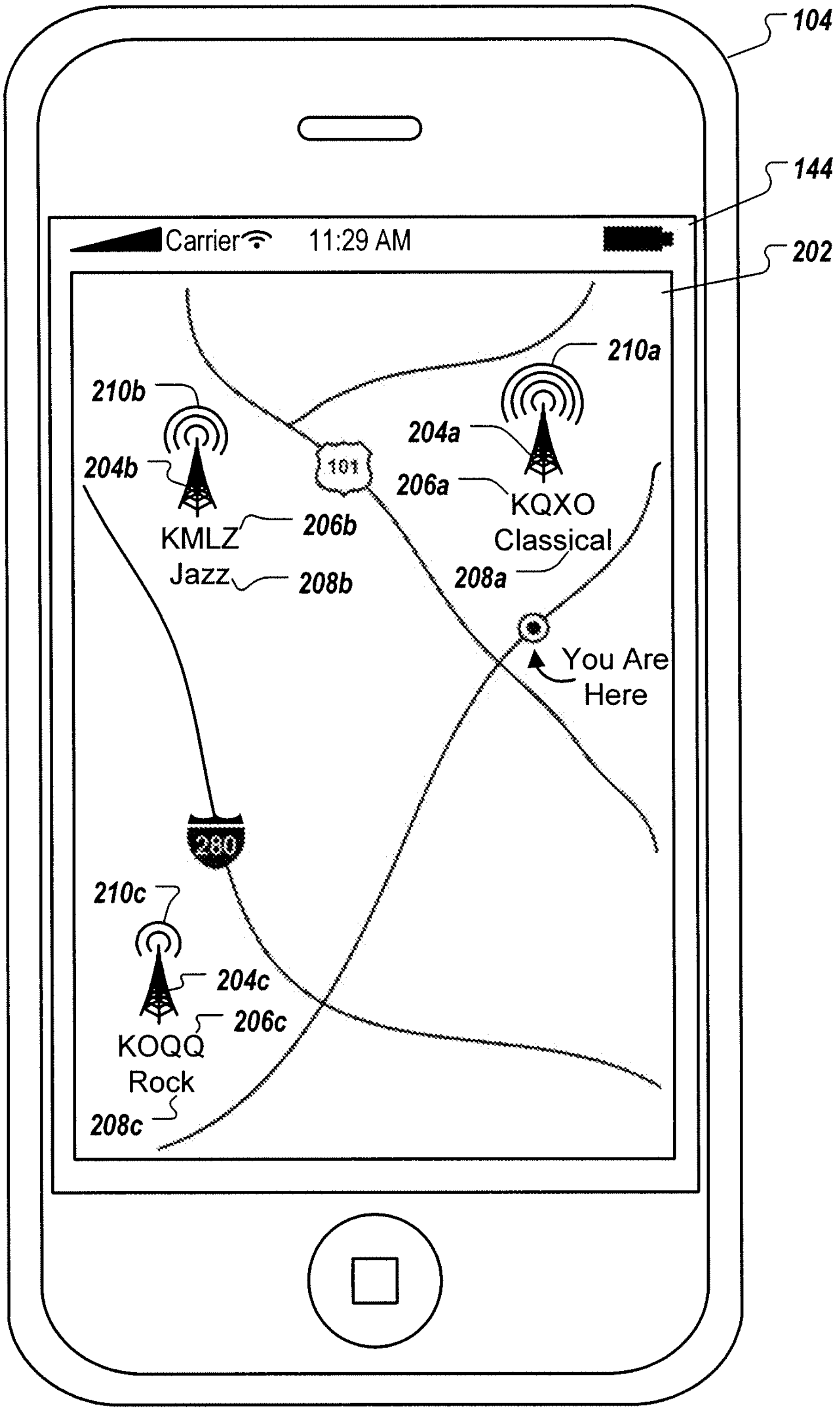
FIGS. 6 and 7 are diagrams of an example FM radio receiver showing information on a display according to various embodiments of the invention.

By using data processor 138 to execute various software applications, FM radio receiver 104 (FIG. 1) can be configured in many ways. Referring to FIG. 6, in some implementations, when FM radio receiver 104 is turned on, touch screen display 144 presents map 202 showing icons of primary FM stations (e.g., 204*a*, 204*b*, and 204*c*, collectively referenced as 204) in the neighborhood. Map 202 may include the station call letters (e.g., 206*a*, 206*b*, and 206*c*, collectively referenced as 206) and the genre (e.g., 208*a*, 208*b*, and 208*c*, collectively referenced as 208) of the program that is currently being played at each station. Map 202 can also show the broadcast signal strength (e.g., 210*a*, 210*b*, and 210*c*) of radio stations 204. In some examples, instead of showing a map, display 144 presents radio stations 204 in a selectable list.

The user can select one of stations 204 by tapping on the icon representing station 204. Data processor 138 controls RF tuner 122 to tune to the frequency of radio station 204 selected by the user. FM radio receiver 104 plays a radio program broadcast from the selected radio station 204, and display 144 presents information related to the program being played.

Similarly, radio receivers 160, 170, and 180 can also be configured in many ways by using data processor 138 to execute various software applications.

Figure 7:
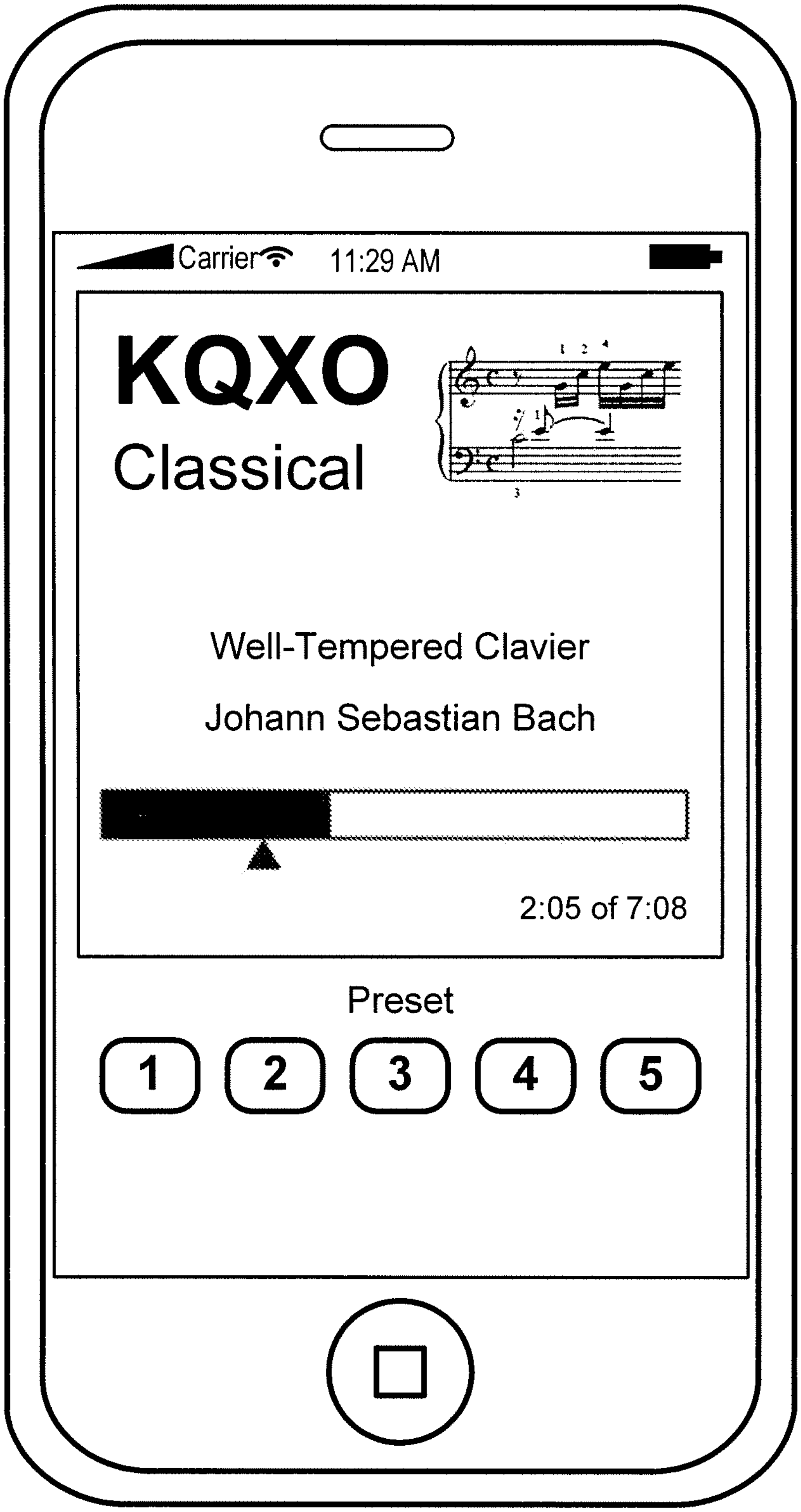

FIG. 7 illustrates an example in which display 144 shows information about a classical music program broadcast from a radio station KQXO.

In some examples, the user can store preferences regarding radio stations or program genres. For example, the user may prefer to listen to programs broadcast by National Public Radio (NPR). When FM radio receiver 104 is turned on, data processor 138 loads user preferences and determines that the user prefers to listen to NPR programs. Data processor 138 identifies local NPR affiliated station(s), and causes display 144 to present map 202 showing the local NPR affiliated station(s). Data processor 138 may communicate with server computer 220 to obtain information about NPR affiliated primary FM stations 100 that are in the neighborhood, and FM translator stations 102 associated with primary FM stations 100. Display 144 can be configured to show, e.g., only primary FM stations 100, or FM translation stations 102 in addition to primary FM stations 100.

When the user travels to a new location and turns on FM radio receiver 104, display 144 can automatically show information about the local NPR affiliated station(s). In this example, FM radio receiver 104 allows the user to easily listen to NPR programs wherever the user travels without the need to know the broadcast frequencies of the NPR affiliated stations in various geographical locations.

When the user travels as he listens to the NPR program played by FM radio receiver 104, the user may move to a location outside of the broadcast range of the station being tuned to. FM radio receiver 104, upon detecting signal fading (e.g., by determining that the broadcast signal strength is below a threshold), determines a current position using information from location sensor 152, communicates with server computer 220 to provide position information, and receives from server computer 220 information about primary FM station(s) 100 and FM translator station(s) 102 associated with the NPR station that are in the vicinity of receiver 104, and information about the broadcast signal strength of the stations. FM radio receiver 104 switches to the station having the strongest signal, and continues to play the NPR program that the user was listening to prior to switching the station.

If the user travels outside the broadcast range of any primary FM station 100 or FM translator station 102 that broadcasts the NPR program that he is listening to, data processor 138 may communicate with server computer 220 to determine whether another NPR affiliated station or its associated FM translator station is available. If there is another NPR affiliated primary FM station 100 or its associated FM translator station 102 that has a stronger broadcast signal strength, FM radio receiver 104 may switch to the other NPR affiliated station or its associated FM translator station. This way, the user continues to listen to NPR programs.

The user preferences may include the genre of programs preferred by the user. For example, the user may prefer to listen to classical music. When FM radio receiver 104 is turned on, data processor 138 loads user preferences and determines that the user prefers to listen to classical music. Data processor 138 may communicate with server computer 220 to obtain information about primary FM stations 100 in the neighborhood that broadcast classical music programs, and FM translator stations 102 associated with primary FM stations 100. Display 144 may present map 202 showing the local radio stations that are playing classical music programs. Display 144 can be configured to show, e.g., only primary FM stations 100, or FM translation stations 102 in addition to primary FM stations 100.

When the user travels to a new location and turns on FM radio receiver 104, display 144 can automatically show information about the stations playing classical music programs. In this example, FM radio receiver 104 allows the user to easily listen to classical music programs wherever the user travels without the need to know which stations play classical music programs in various geographical locations.

Suppose the user is initially located within broadcast range of primary FM station 100. When the user travels as he listens to the program played by FM radio receiver 104, the user may move to a location outside of the broadcast range of primary FM station 100. FM radio receiver 104, upon detecting signal fading, determines a current position, communicates with server computer 220 to provide position information, and receives from server computer 220 information about FM translator stations 102 associated with primary FM station 100, and information about the broadcast signal strength of FM translator stations 102. FM radio receiver 104 switches to FM translator station 102 having the strongest signal, and continues to play the classical music program that the user was listening to prior to switching the station.

If the user travels outside the broadcast range of any FM translator station that broadcasts the classical music program that he is listening to, data processor 138 may communicate with the server computer 220 to determine whether there is another primary FM station 100 or its associated FM translator station 102 that broadcasts classical music programs. If there is another primary FM station 100 or its associated FM translator station 102 that broadcasts classical music programs and has a greater broadcast signal strength, FM radio receiver 104 may switch to the other primary FM station 100 or its associated FM translator station 102. This way, the user continues to listen to classical music programs, even though the program may change after the switching of stations.

In some examples, FM radio receiver 104 may store a list of a user's favorite stations, and automatically update the list of favorite stations based on the user's location. For example, the list of favorite stations may be updated so that a primary FM station is replaced with an FM translator station that broadcasts the same content, or replaced with a different station that broadcasts programs of the same genre.

In some examples, traffic data in maps can be updated to include radio station information for stations that broadcast traffic information. For example, if a station broadcasts traffic updates at 5 minutes past the hour, a link to that station can be provided next to areas of bad traffic in maps between 5 and 10 minutes past the hour. The stations appear on the map when the stations can provide useful (e.g., up-to-date) traffic information. The stations shown on the map can be dynamically updated based on traffic broadcast time as well as the location of FM radio receiver 104.

The techniques for switching from one radio station to another radio station can also be applied to switching among stations that are broadcasting syndicated programs. For example, FM radio receiver 104 can tune to the user-selected radio station to play a radio program. Upon detecting signal fading, receiver 104 communicates with server computer 220 to determine whether the program being played is a syndicated program, and whether there are other radio stations within reception range that are simultaneously broadcasting syndicated programs having the same program content. If server computer 220 determines there are other radio stations within reception range that are simultaneously broadcasting syndicated programs having the same program content, server computer 220 sends receiver 104 information about the radio stations and their estimated signal strength. Receiver 104 switches to a different radio station having the strongest signal strength to play the syndicated program broadcast at a different frequency.

Figure 8:
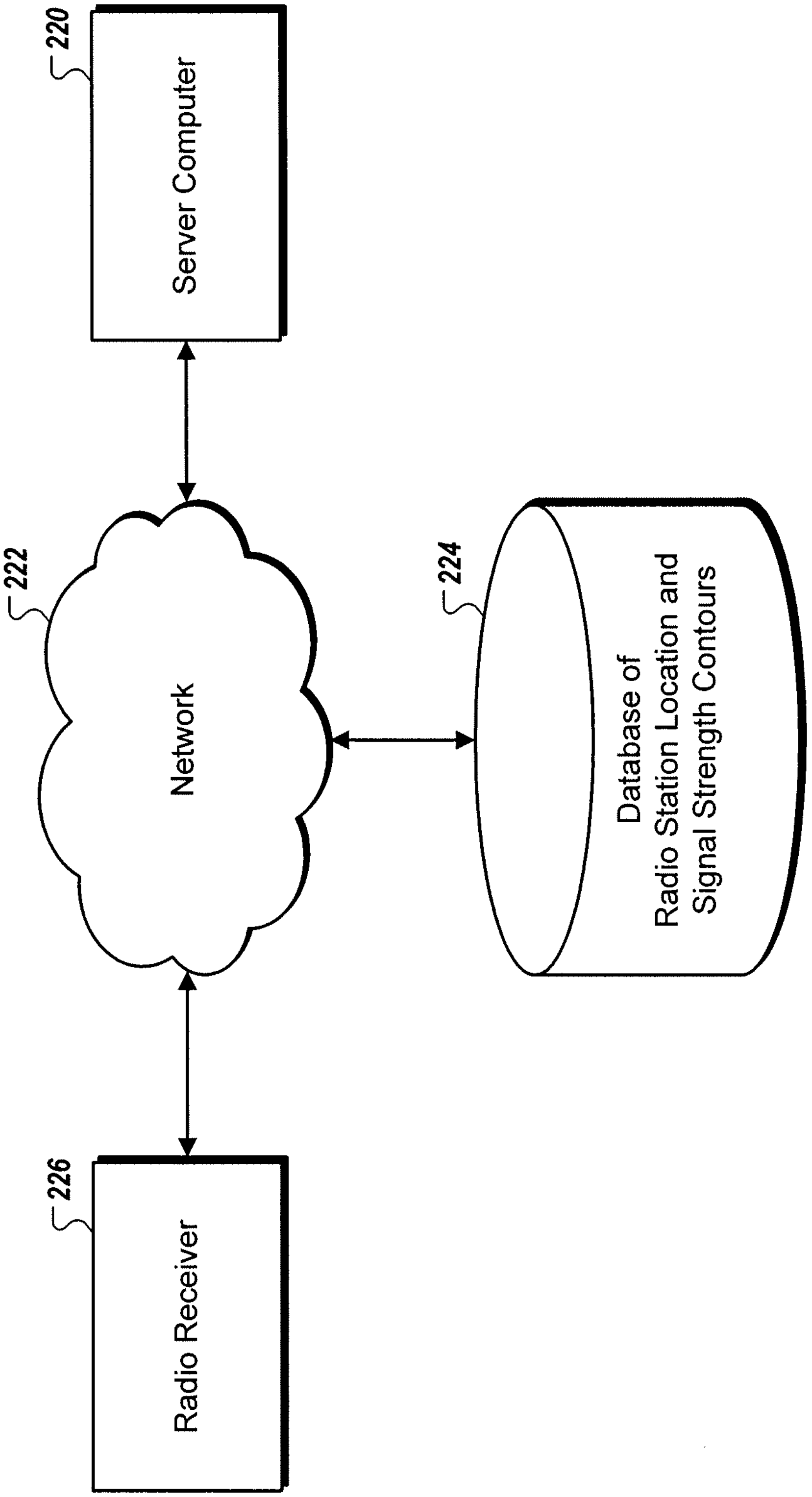
FIG. 8 shows a diagram of an example FM radio receiver in communication with a server computer.

Referring to FIG. 8, in some implementations, radio receiver 226 communicates with server computer 220 through network 222, such as the Internet. Server computer 220 may perform a variety of computing tasks, such as accessing database 224 having information about locations of radio stations and their broadcast signal strength contours and identifying radio stations in the neighborhood of radio receiver 226 based on information obtained from database 224. Server computer 220 may estimate the strength of signals of the radio stations received by radio receiver 226 based on the location of radio receiver 226 and information about the broadcast signal strength contours of the radio stations. Server computer 220 may transmit the identified radio stations and their estimated broadcast signal strength to radio receiver 226. Radio receiver 226 can be, e.g., radio receiver 104 (FIG. 2), radio receiver 160 (FIG. 3), radio receiver 170 (FIG. 4), or radio receiver 180 (FIG. 5).

Figure 9:
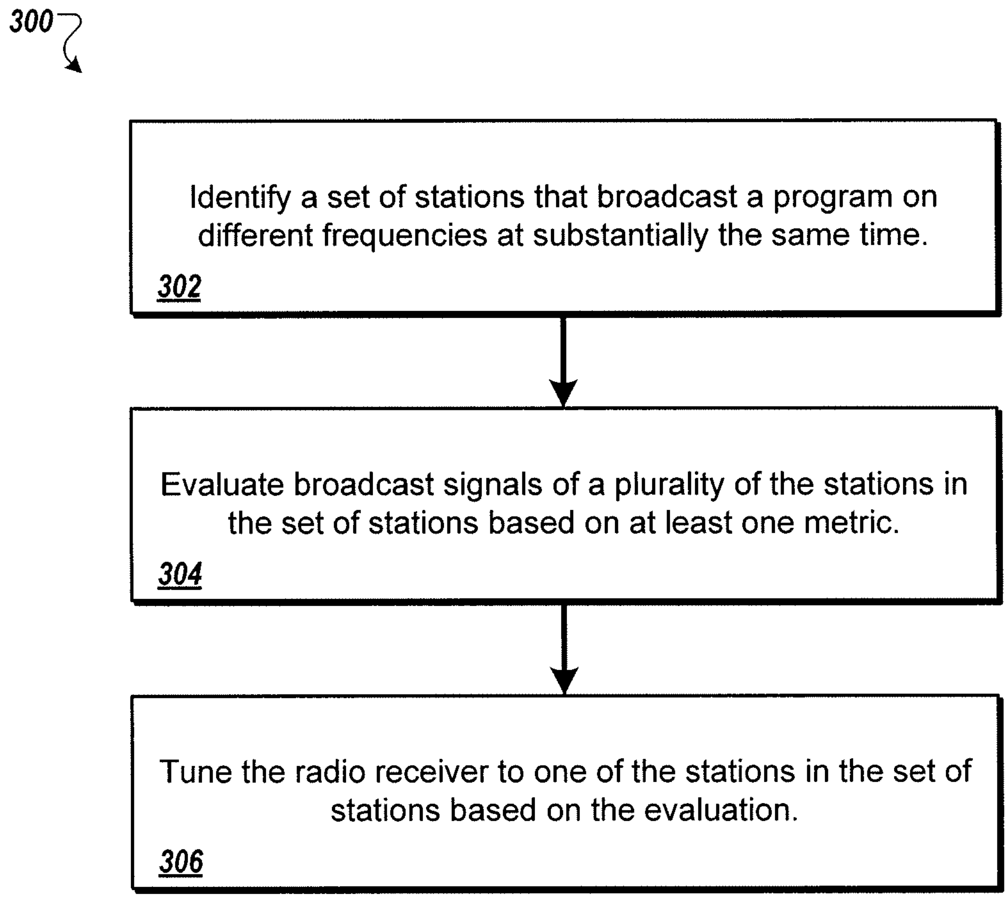
FIGS. 9-14 are exemplary flow diagrams according to various embodiments of the invention.

FIG. 9 is a flow diagram of example process 300 for operating a radio receiver. For example, the radio receiver can be the FM radio receiver 104 of FIG. 2. In process 300, at the radio receiver, a set of stations that broadcast a program on different frequencies at substantially the same time are identified (302). For example, the set of stations can include a primary FM station and FM translator stations.

Broadcast signals of a plurality of the stations in the set of stations are evaluated based on at least one metric (304). For example, the broadcast signal strength of the signals from several stations can be evaluated. The broadcast signal strength of the signals can be measured, or estimated based on information about a location of the radio receiver and information about signal strength contours of the stations. The signals can also be evaluated based on other quality metrics, such as whether the signals support mono, stereo, or surround audio.

The radio receiver is tuned to one of the stations in the set of stations based on the evaluation (306). For example, the radio receiver can tune to the station having the greatest broadcast signal strength, or having the highest quality as determined based on one or more quality metrics.

Figure 10:
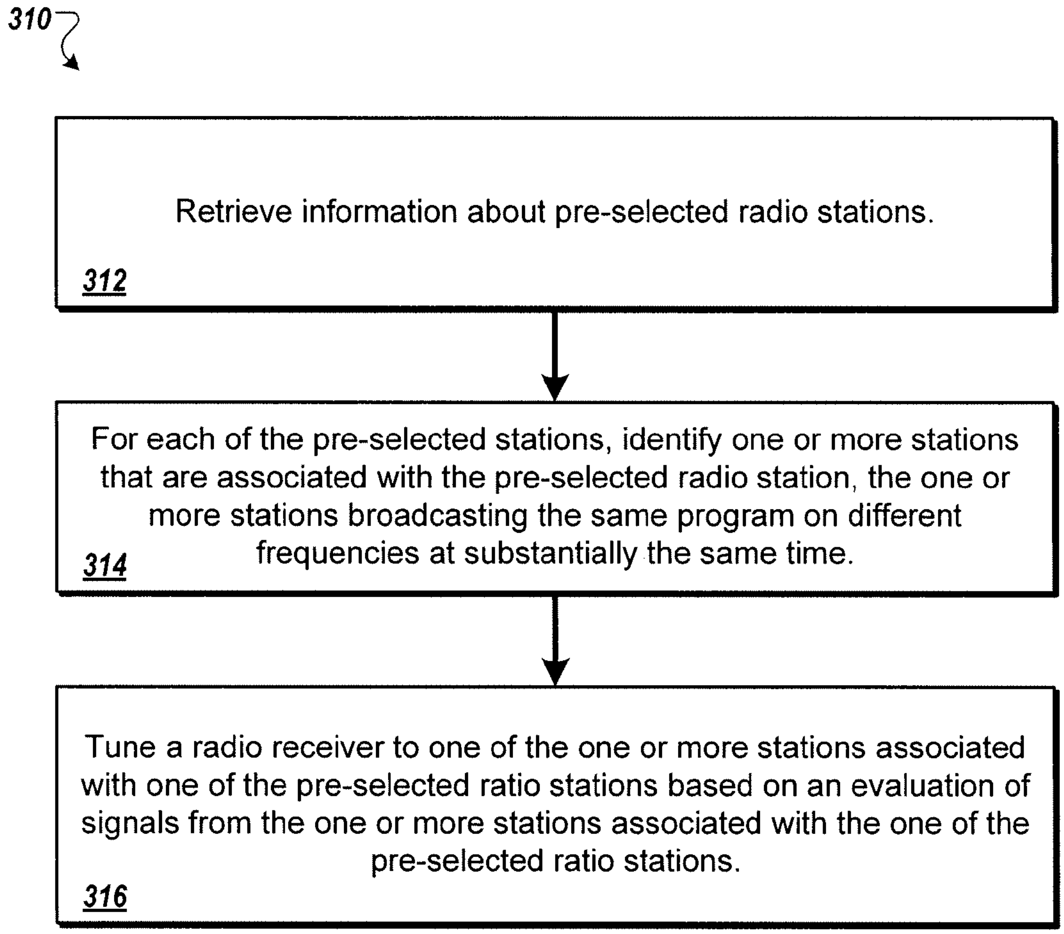

FIG. 10 is a flow diagram of example process 310 for operating a radio receiver. For example, the radio receiver can be the FM radio receiver 104 of FIG. 2. Process 310 includes retrieving information about pre-selected radio stations (312). For example, the pre-selected radio stations can be FM radio stations.

For each of the pre-selected stations, radio stations that are associated with the pre-selected radio station are identified, in which the radio stations broadcast the same program on different frequencies at substantially the same time (314). For example, one of the pre-selected stations can be an FM radio station, and the radio stations that are associated with the pre-selected radio station can be a primary FM station and FM translator stations.

The radio receiver is tuned to one of the radio stations associated with one of the pre-selected radio stations based on an evaluation of signals from the radio stations associated with the pre-selected radio station (316). For example, the radio receiver can be tuned to one of the stations based on measured or estimated broadcast signal strength of the signals from the stations.

Figure 11:
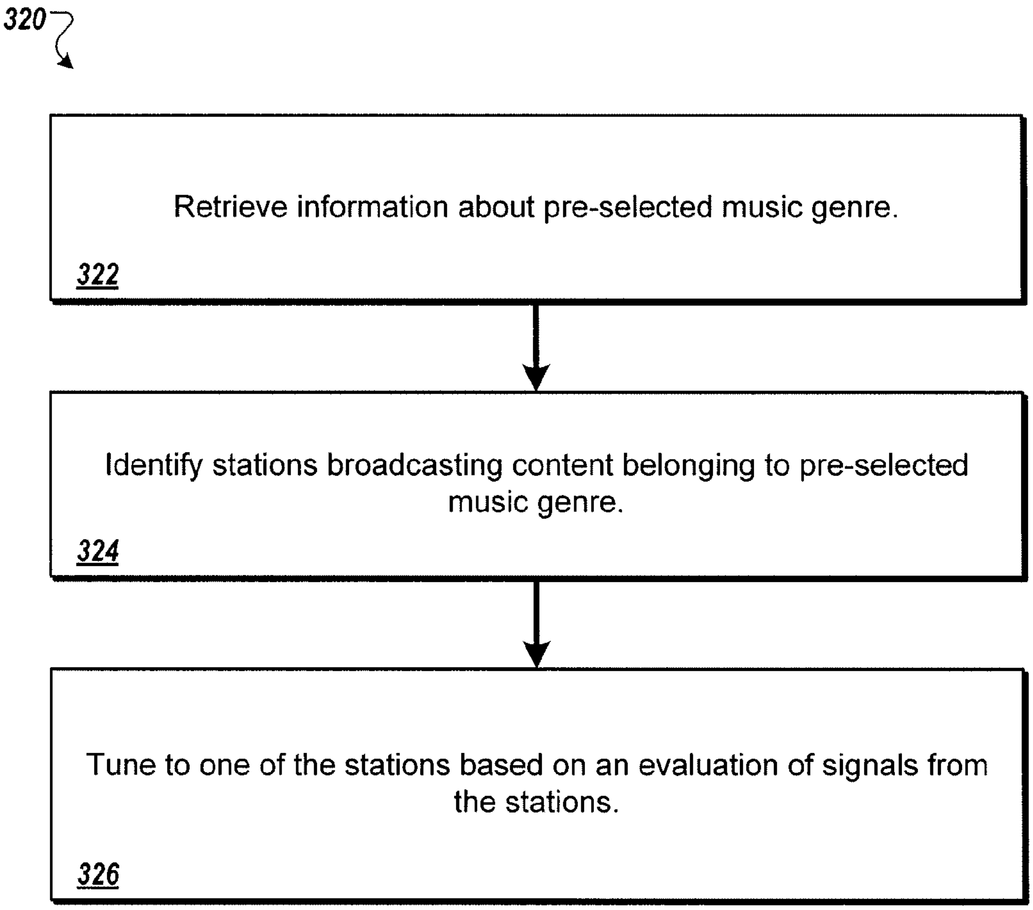

FIG. 11 is a flow diagram of an example process 320 for operating a radio receiver. For example, the radio receiver can be the FM radio receiver 104 of FIG. 2. Process 320 includes retrieving information about a pre-selected music genre (322). For example, the user may prefer to listen to classical music programs.

Stations that are broadcasting content belonging to the pre-selected music genre are identified (324). For example, primary FM stations and FM translator stations in the vicinity of the radio receiver that broadcast classical music can be identified.

The radio receiver is tuned to one of the stations based on an evaluation of the signals from the stations (326). For example, the broadcast signal strength of the signals can be evaluated.

Figure 12:
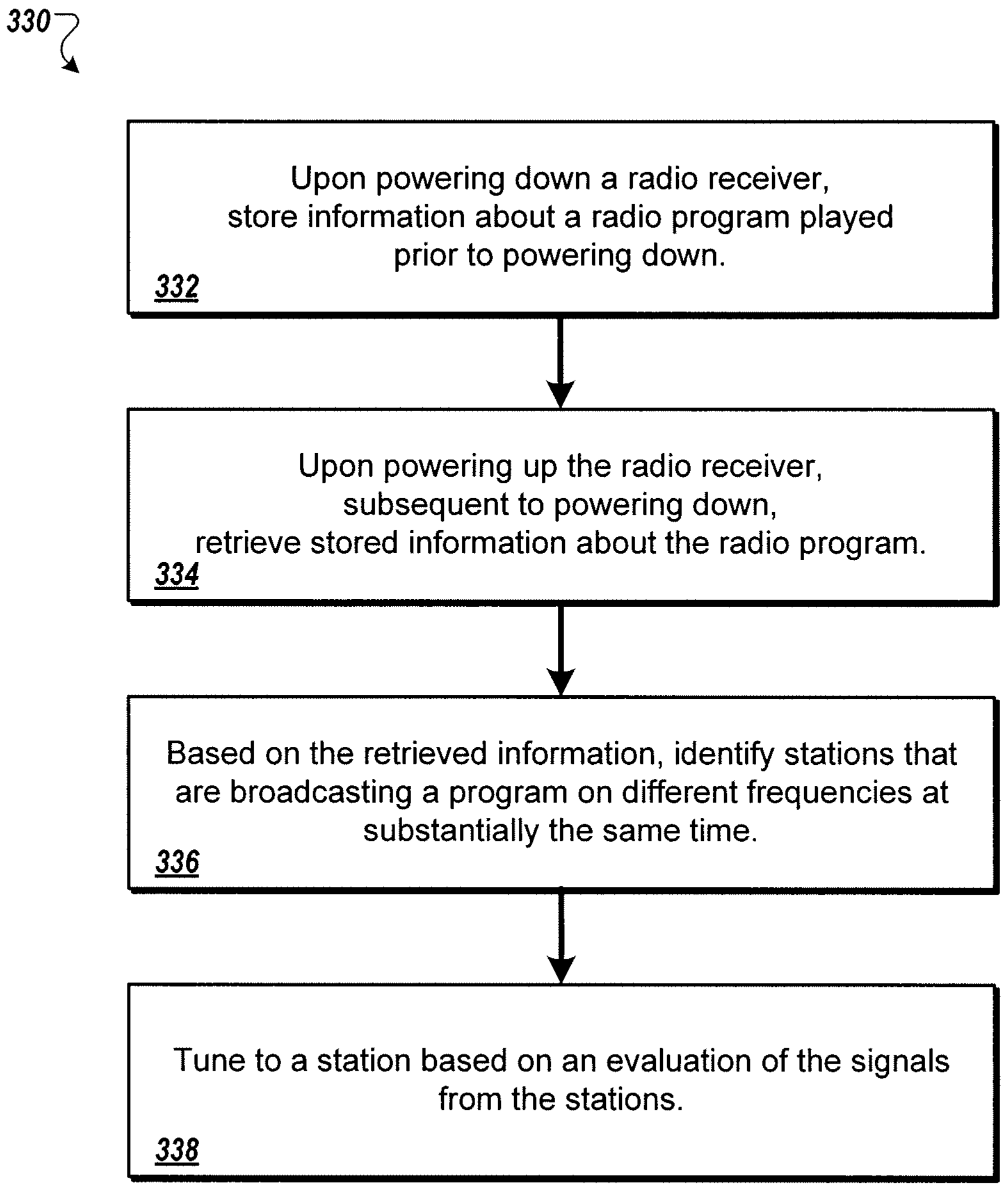

FIG. 12 is a flow diagram of an example process 330 for operating a radio receiver. For example, the radio receiver can be the FM radio receiver 104 of FIG. 2. Process 330 includes, upon powering down a radio receiver, storing information about a radio program that was played prior to powering down (332). For example, the information can include the name and genre of the radio program, and the station which broadcast the program.

Based on the retrieved information, stations that are broadcasting a program on different frequencies at substantially the same time are identified (334). For example, if the user was listening to Car Talk on NPR prior to powering down, the radio receiver may identify stations that are broadcasting Car Talk, or stations that are broadcasting NPR programs.

The radio receiver is tuned to one of the stations based on an evaluation of the signals from the stations (338). For example, the broadcast signal strength of the signals can be evaluated, and the radio receiver is tuned to the station broadcasting Car Talk or an NPR program that has the strongest broadcast signal strength.

Figure 13:
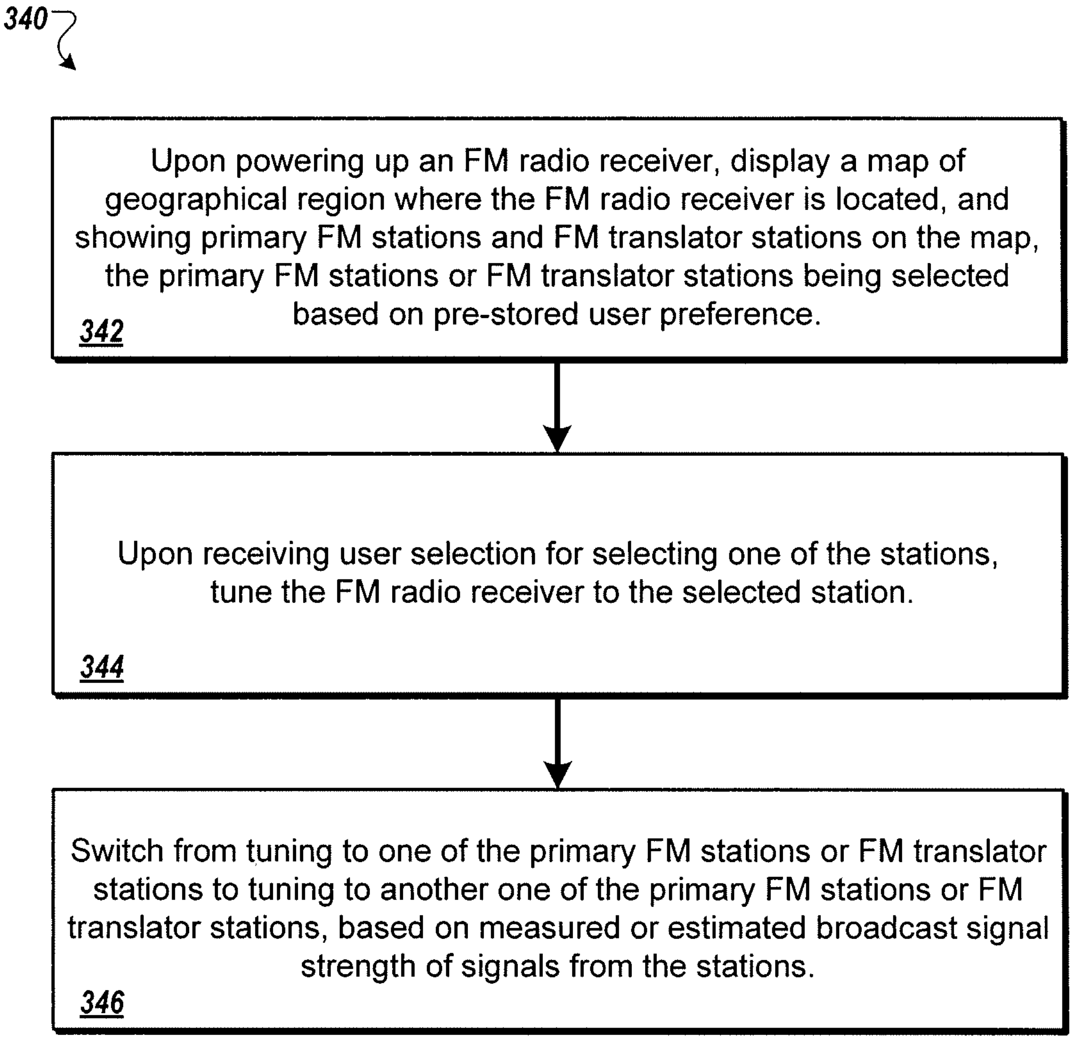

FIG. 13 is a flow diagram of an example process 340 for operating an FM radio receiver. For example, the radio receiver can be the FM radio receiver 104 of FIG. 2. Process 340 includes, upon powering up an FM radio receiver, displaying a map of a geographical region where the FM radio receiver is located, and showing primary FM stations and FM translator stations on the map, the primary FM stations or FM translator stations being selected based on pre-stored user preference (342). For example, the user may indicate a preference for classical music, and the map may display primary FM stations and FM translator stations that broadcast classical music.

Upon receiving a user selection for selecting one of the stations, the FM radio receiver is tuned to the selected station (344). For example, the user map select one of the stations through the touch screen 144.

The FM radio receiver switches from one of the primary FM stations or FM translator stations to another one of the primary FM stations or FM translator stations based on measured or estimated broadcast signal strength of the signals from the stations (346). For example, the switching may occur when the user travels outside the broadcast range of a station that the receiver is tuned to.

Figure 14:
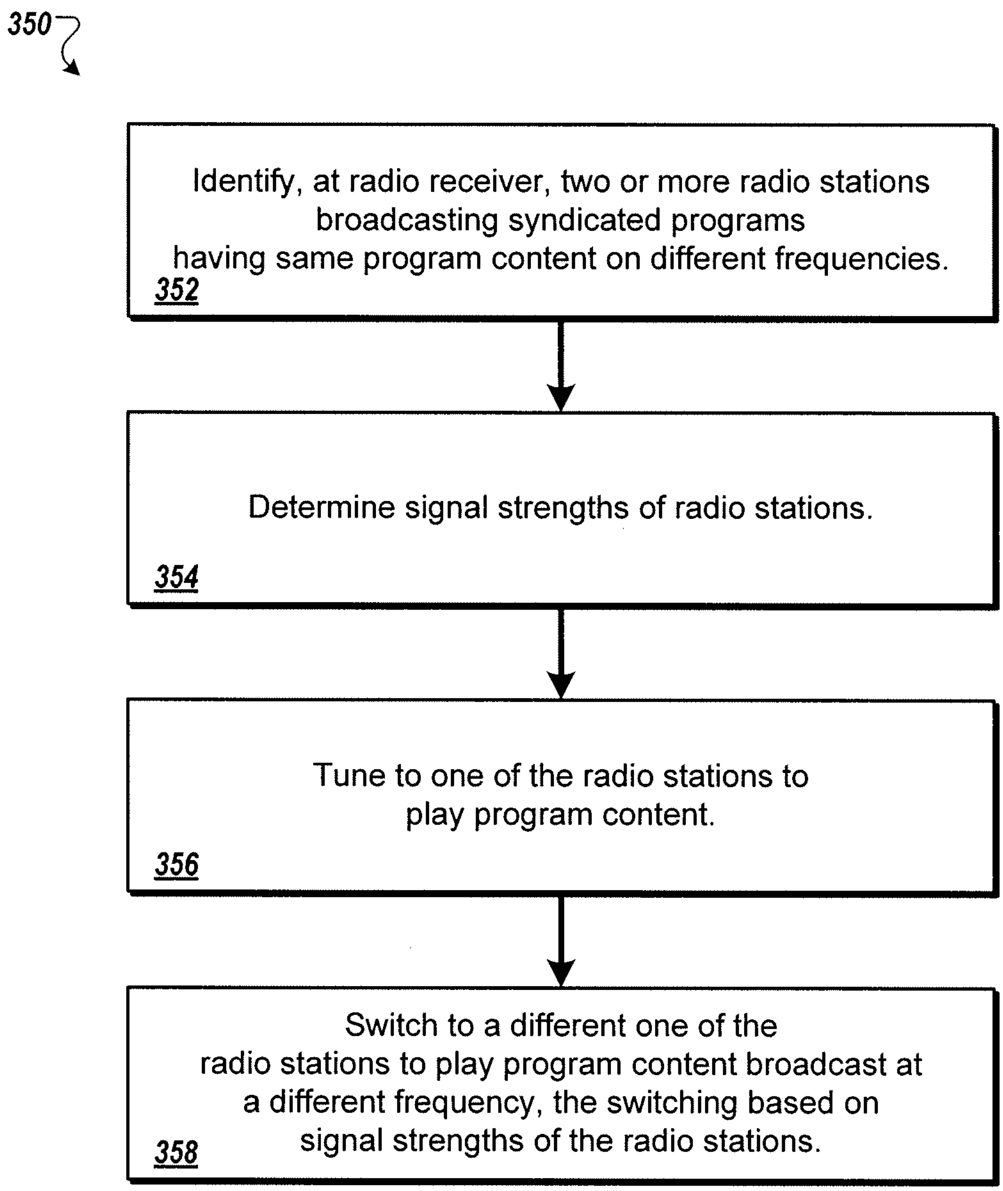

FIG. 14 is a flow diagram of an example process 350 for operating an FM radio receiver. For example, the radio receiver can be the FM radio receiver 104 of FIG. 2. Process 350 includes identifying, at the radio receiver, two or more radio stations that are broadcasting syndicated programs having the same program content on different frequencies (352). For example, the syndicated programs can be broadcast at substantially the same time by the radio stations. Process 350 includes determining the broadcast signal strength of the signals from the radio stations (354), tuning to one of the radio stations to play the program content (356), and switching to tuning to a different one of the radio stations to play the program content broadcast at a different frequency, the switching being based on the broadcast signal strength of the signals of the radio stations (358).

Although some examples have been discussed above, other implementations and applications are also within the scope of the following claims. For example, the techniques described above are not limited to broadcasts that use the transmission protocols or frequency bands described above, and can also be used for other transmission protocols or frequency bands. The radio broadcasts can be analog or digital broadcasts, or a combination of both.

In some implementations, each of the radio receivers described above may have a button that, when selected by the user, causes the radio receiver to initiate the process of finding other radio stations that are broadcasting the same radio program and switching to the radio station having the strongest signal. The user interfaces of the radio receiver may be different from those described above. For example, the radio receiver may not have any display. The radio receiver may announce via an audio signal each of the list of radio stations and allow the user to select one of the radio stations. In the examples of FIGS. 2 to 5, data processor 138 executes software instructions or code to enable radio receivers 104, 160, 170, and 180 to perform various functions. Radio receivers 104, 160, 170, and 180 can also have dedicated analog and/or digital circuitry to perform each or some of the functions.

The various examples and features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a liquid crystal display (LCD), an organic light emitting diode (OLED) display, a micro-electro-mechanical systems (MEMS) based reflective display, or electronic paper (e.g., an electrophoretic display or an electro-wetting display), for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

What is claimed is:

1. A method comprising:

identifying, at a radio receiver, a set of stations that broadcast a program using different frequencies or different transmission protocols at substantially the same time;

estimating broadcast signal strength of broadcast signals of a plurality of the stations in the set of stations based on longitude and latitude coordinates of the radio receiver and information about signal strength contours of the stations; and tuning the radio receiver to one of the plurality of stations in the set of stations based on the evaluation.

2. The method of claim 1, comprising communicating with a server computer to obtain information on estimated broadcast signal strength of broadcast signals of a plurality of the stations in the set of stations.

3. The method of claim 1, further comprising, evaluating broadcast signals of a plurality of the stations in the set of stations based on at least one metric, and automatically switching to tuning to another one of the plurality of stations in the set of stations based on the evaluation.

4. The method of claim 1, comprising after tuning to one of the stations, continue to tune to the same station until the signal strength of the broadcast signal falls below a threshold, then change to tuning to a different one of the stations that has a measured or estimated signal strength that is above the threshold.

5. The method of claim 1 in which identifying, at a radio receiver, a set of stations comprises identifying, at an FM radio receiver, a primary FM station and FM translator stations associated with the primary FM station.

6. The method of claim 1 in which the set of stations comprise at least two radio stations that broadcast radio programs using different transmission protocols.

7. The method of claim 1, comprising buffering data representing signals from two stations, synchronizing the signals by adjusting the buffering of the data, and switching from one station to the other after the signals are synchronized.

8. The method of claim 1, comprising upon powering down the radio receiver, storing information about a radio program that was played prior to powering down, upon powering up the radio receiver subsequent to the powering down, retrieving stored information about the radio program, identifying a second set of stations based on the retrieved information, the second set of stations broadcasting a program using different frequencies or different transmission protocols, and tuning the radio receiver to one of a plurality of stations in the second set of stations based on an evaluation of the plurality of stations.

9. A method comprising:

retrieving information about pre-selected radio stations;

for each of the pre-selected stations, identifying, at a radio receiver, one or more stations that are associated with the pre-selected radio station, wherein the one or more stations broadcast a program that is broadcasting on the pre-selected radio station using different frequencies or different transmission protocols;

estimating broadcast signal strength of the one or more stations using broadcast signal strength contour values of the one or more stations;

tuning the radio receiver to one of the one or more stations associated with one of the pre-selected radio stations based on an evaluation of signals from the one or more stations associated with the one of the pre-selected radio stations;

displaying a map on a user interface; and showing the one or more radio stations associated with the pre-selected radio stations on the map.

10. The method of claim 9, comprising, upon receiving a user selection for selecting one of the stations, tuning to the selected station, and upon detecting that a signal strength of the selected station is below a threshold, searching for another associated station that has a measured or estimated signal strength greater than that of the selected station, and switch to tuning to the other station.

11. An apparatus comprising:

a radio receiver, comprising:

a first tuner;

a second tuner;

a signal evaluator to evaluate signals from the first and second tuners based on at least one metric;

a data processor to control the first and second tuners to tune to two stations that broadcast a program on different frequencies at substantially the same time, and select one of the first and second tuners based on evaluation data provided by the signal evaluator; and a memory buffer that stores data representing signals from the first and second tuners, wherein the data processor synchronizes the signals from the first and second tuners using the memory buffer.

12. The apparatus of claim 11 in which each of the first and second tuners comprises at least one of an FM tuner, an AM tuner, or a satellite tuner.

13. The apparatus of claim 11 in which the at least one metric comprises a broadcast signal strength.

14. The apparatus of claim 11 in which a signal from the selected tuner is processed and output to a user, and the data processor uses the tuner that is not selected to find another more suitable station based on the at least one metric.

15. The apparatus of claim 11 comprising a storage device to store information about broadcast stations at various locations, and information about which stations broadcast the same programs at substantially the same time.

16. An apparatus comprising:

a tuner; and a data processor to identify a set of stations that broadcast a radio program on different frequencies at substantially the same time, and control the tuner to tune to one of the stations based on an evaluation of signals from a plurality of the stations in the set of stations, wherein the data processor evaluates the signals by estimating broadcast signal strength of the signals based on longitude and latitude coordinates of the radio receiver and information about broadcast signal strength contours of the stations.

17. The apparatus of claim 16, comprising a signal strength detector to measure a signal strength of a signal selected by the tuner, and the evaluation of the signal is based at least in part on the measured signal strength of the signal.

18. The apparatus of claim 16 in which the data processor communicates with a server computer to obtain information on estimated broadcast signal strength of signals from a plurality of the stations in the set of stations, and evaluates the signals based on the information obtained from the server computer.

19. The apparatus of claim 16 in which the tuner comprises at least one of an FM tuner, an AM tuner, and a satellite tuner.

20. A method comprising:

identifying, at a radio receiver, a set of stations that broadcast a program using different frequencies or different transmission protocols at substantially the same time;

evaluating broadcast signals of a plurality of the stations in the set of stations based on at least one metric;

tuning the radio receiver to one of the stations in the set of stations based on the evaluation;

upon powering down the radio receiver, storing information about a radio program that was played prior to powering down;

upon powering up the radio receiver subsequent to the powering down, retrieving stored information about the radio program;

identifying a second set of stations based on the retrieved information, the second set of stations broadcasting a program using different frequencies or different transmission protocols; and tuning the radio receiver to one of a plurality of stations in the second set of stations based on an evaluation of the plurality of stations.

* * * * *